Patented Aug. 7, 1928.

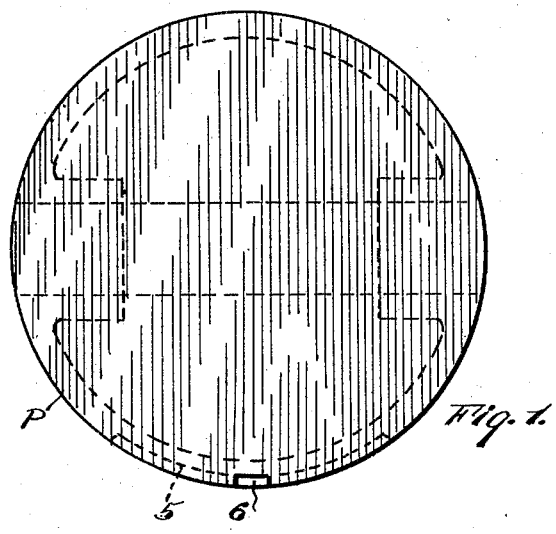
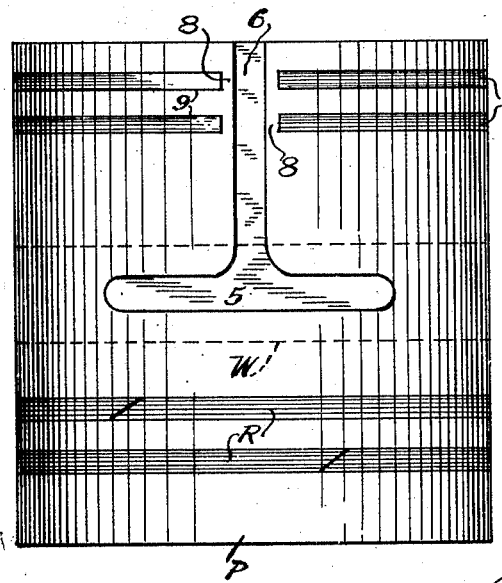
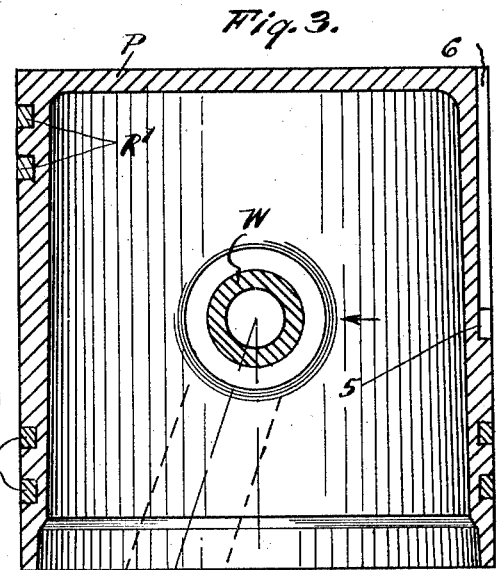

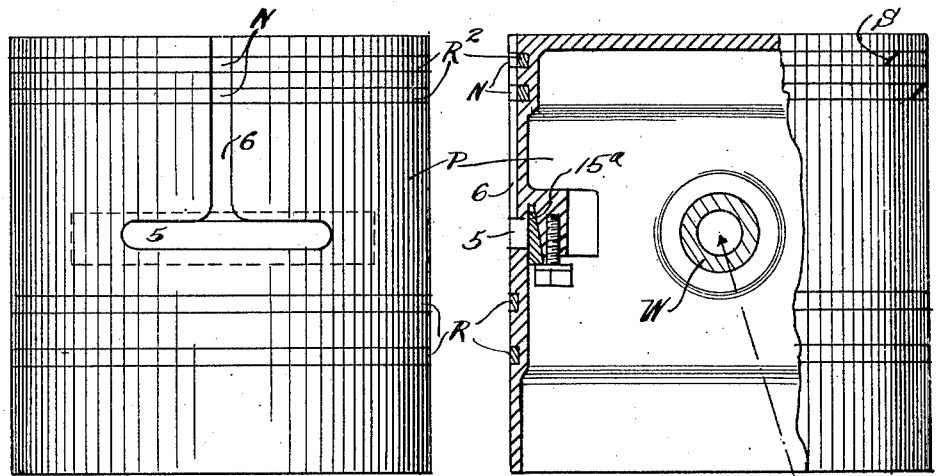
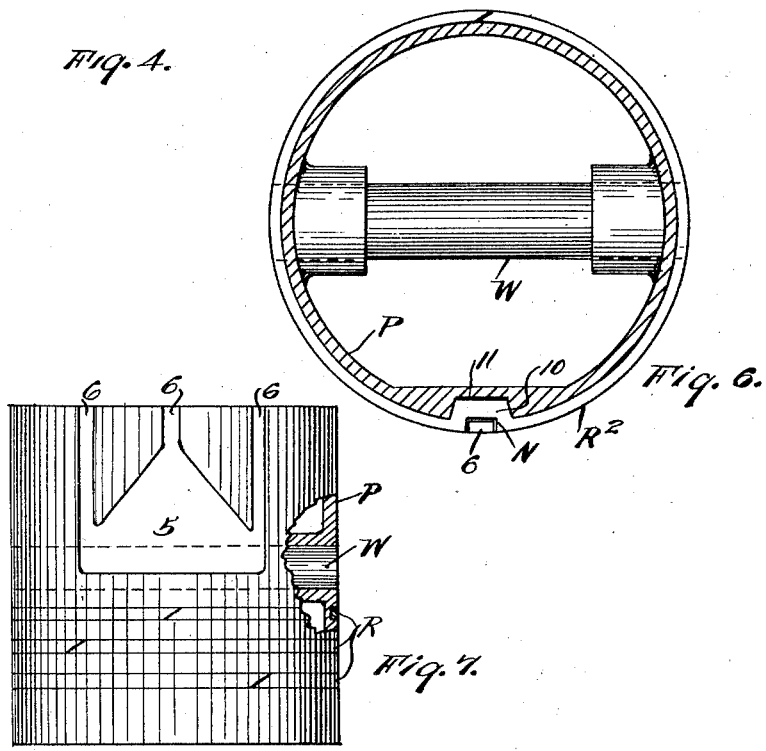

1,679,964

UNITED STATES PATENT OFFICE.

CLARENCE G. EDWARDS, OF LOS ANGELES, CALIFORNIA.

COUNTERTHRUST PRESSURE PISTON.

Application filed March 22, 1926. Serial No. 96,521.

This invention relates to trunk pistons for motors and more especially to internal combustion and explosion engines.

My application Ser. No. 64,921, filed Oct. 26, 1925, generally sets forth improvements in a trunk piston of such structure as to very materially reduce the friction which is caused by reaction laterally by the connecting link, more especially while on the power stroke and in oblique position as to the axis of the piston. In that application I show a piston having a corner which is rebated at a side which is lateral to the axis of the wrist-pin, so that motive pressure is exerted at lines transverse to the piston and thereby tends to press the piston in lines contrary to the undesired side thrust given by the connecting rod or link.

My present invention has to do with refinements of design and construction to the end of simplification of apparatus and especially to provide for better control of the forces as to degree of pressure and time of maximum lateral effort.

An important object is to provide means for the accomplishment of the desired effects with the least possible departure from the approved and conventional type of simple, cylindrical-shell trunk piston.

Another object is to provide a piston having a secondary combustion recess, in its outer cylindrical surface, which throughout its whole bottom area is subject to unbalanced gas pressure; all of the pressure effective on the recess surface, practically speaking, being useful in counteraction to side thrust by the connecting link.

I am aware that it has been proposed to reduce side thrust by providing a tubular passage in the top of a trunk piston and to open the tube out to a side lateral to the wrist-pin. But this involves several disadvantages among which are special structural tube form; the balance of pressure on all points in the tube except at the area equal and opposed to the side outlet of the tube, and, further, the destruction of mechanical balance of the piston on the wrist-pin by an undesirable superabundance of metal to form the tube.

Other objects and advantages will be made manifest in the ensuing specification of apparatus embodying features of the invention, it being understood that modifications, variations and adaptations may be resorted to within the spirit of the invention and its scope as is here claimed.

Figure 1 is a top plan of a form of the improved piston. Figure 2 is a side elevation and Figure 3 a longitudinal section, centrally, and across the wrist-pin and along the canal to the secondary combustion chamber in the piston, of Figure 1.

Figure 4 is a side elevation and Figure 5 a partial longitudinal section of a form having full piston rings with nicks permitting flow to the lateral recess in the piston. Figure 6 is a cross-section showing the nicked ring in plan and in place.

Figure 7 shows a form, in elevation and partial section, having all of the rings below the combustion recess and showing this as having a plurality of feed canals.

The broad concept of my present invention is to keep just as close to standard piston construction as possible and yet obtain a great advantage in operation by providing what will be hereinafter called the pressure recess or recesses, as probably best describing the cardinal feature of the improvement. This term is to be broadly construed as meaning one or more shallow grooves or depressions cut, cast or sunk in the cylindrical face of a trunk piston and extending longitudinally, or peripherally, or both, and in any desired configuration or outline; this pressure recess being open throughout in direct opposition to the near cylinder wall of the motor and leading by an open canal to the top of the piston into the main combustion chamber so that when partial vacuum is created in this chamber it extends to the pressure recess and then upon a compression of a fuel charge this also passes into the pressure recess. When the fuel in the main chamber fires this is followed by firing of the charge in the recess, in the side of the piston, and the generated pressure, acting unbalanced throughout the area of the recess (less merely side lip area tends to thrust the piston toward the opposite wall of the engine chamber. By placing the recess directly opposite to one side of the wrist-pin the side thrust of the connecting link on this is counteracted.

A form of the invention, which has been successfully embodied in practice, is shown in Figs. 1, 2 and 3, in which a piston P, of conventional shape, has a lower set of full rings R below the wrist-pin W, for the usual connecting link L (shown dotted).

In a side face of the piston P directly opposite the wrist-pin W and opposed to reaction of link thurst (Fig. 3), there is provided a shallow groove or recess 5 of any desired length, width or form, which leads by open canal means, as a groove or grooves 6, to the near corner of the piston.

This canal means, therefore, forms a mouth or mouths between the corner of the piston and the near wall of the chamber (not shown) permitting the inflow of fuel to the recess 5 and burnt gas outflow from it (under vacuum). In this form of the invention the upper piston rings $R^1$ are sufficiently divided or cut out between their ends as to leave a space for end walls 8 at each side of the canal 6; these walls closing the ring grooves 9, in the piston, so that operative pressure will not escape from the canal to the ring grooves. In this form of the invention the recess 5 is well elongated peripherally in planes along the wrist-pin.

In Figs. 4, 5 and 6, the piston has rings $R^2$ with nicks N opposite to the usual split S and these nicks register with the canal 6.

Any means may be employed to hold the rings $R^2$ against derangement of the nicks N from the canal, as by back-setting the ring at 10 into a notch 11 made for it in the piston shell. This form of the invention eliminates the shoulders 8 of Fig. 2.

The bottom of the recess 5 may be removable, as in the form of a segment $15^a$, Fig. 5. This will permit the ready removal of carbon by the removal of segment $15^a$ without taking out the piston.

In Fig. 7 the piston is shown as having a plurality of canals 6 leading to the pressure recess. It also shows all of the piston rings as below the wrist-pin W.

The width, length and depth of the canal means 6 determine the amount of pressure becoming effective on the recess bottom or wall surface, and the restricted cross-area of the canal will also determine the relatively retarded application of the pressure against the recess bottom it being desired to effect the application of pressure when the piston link L is at its greatest obliquity to the piston axis on power stroke, and when the crank is at the half stroke angle or 90 degrees to the piston axis, this being the maximum moment of leverage position.

It is reiterated that the shallow recess 5 may lie in any direction and be of any contour and any number may be employed.

The shallow recess of the piston hardly unbalances the poise of the piston to any detrimental degree, but the piston may be exactly counterpoised, if desired, by weight to offset the cavity. The recess may be cast, cut or sunk in the shell.

What is claimed is:

1. A piston of cylindrical form and having wrist-pin, and having in its external cylindrical surface a shallow recess for the flow of motive pressure; said recess extending from the piston head corner down to about the plane of the wrist-pin axis.

2. A piston of cylindrical form and having a wrist-pin, the cylindrical surface of the piston being slightly recessed peripherally at about the plane of and opposite to the wrist-pin and having canal communication along the piston surface to the head thereof for passage of motive fluid to the recess.

3. A piston of cylindrical form and having a wrist-pin, and having a shallow, peripheral recess in the outer surface in a side opposite to the wrist-pin, and shallow canals leading along the surface to the piston head corner for motive fluid flow to the recess.

4. A trunk piston having in a side opposite to its wrist-pin a longitudinal, shallow canal leading directly from the rear piston head corner.

5. A trunk piston having in a side opposite to its wrist-pin a longitudinally extending, shallow canal leading straight from the near piston head corner to about the plane of the axis of the wrist-pin.

6. A trunk piston having a canal running along one side face opposite to the wrist-pin and out to the head of the piston, and a peripherally elongated recess in the piston surface and communicating with the canal.

7. A trunk piston having piston rings, and having a pressure fluid recess below the rings, which latter are peripherally interrupted to provide for fluid flow to the recess from the top of the piston without interference of the rings.

8. A trunk piston having piston rings, said rings being peripherally interrupted to provide a space for the passage of motive pressure fluid along the outer surface of the piston.

9. A trunk piston having piston rings, and having, in its outer surface, a counter thrust pressure recess; said rings having peripheral notches providing for the flow of motive pressure along the surface of the piston to the pressure recess.

10. A piston having a head and having a diametrical wrist-pin; said piston having in its outer surface in a side opposite the wrist-pin a constricted canal opening at its upper end at the head corner and at its lower end enlarging around the piston.

11. A piston having a combustion recess in a side wall, and a removable, inner wall for the recess; whereby the removal of carbon may be facilitated.

12. A piston having a surface exposed to combustion effect; said surface being removable from within the piston to permit of cleaning thereof.

CLARENCE G. EDWARDS.